US 12,441,458 B2

(12) United States Patent
Bensmann et al.

(10) Patent No.: US 12,441,458 B2
(45) Date of Patent: Oct. 14, 2025

(54) SUPPORT ARRANGEMENT FOR A LEADING-EDGE HIGH LIFT DEVICE WITH A FLUID DUCT

(71) Applicant: Airbus Operations GmbH, Hamburg (DE)

(72) Inventors: Stefan Bensmann, Hamburg (DE); Martin Fees, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 57 days.

(21) Appl. No.: 18/333,964

(22) Filed: Jun. 13, 2023

(65) Prior Publication Data

US 2023/0406481 A1 Dec. 21, 2023

(30) Foreign Application Priority Data

Jun. 15, 2022 (EP) .................................... 22179331

(51) Int. Cl.
*B64C 9/02* (2006.01)
*B64C 9/22* (2006.01)
*B64D 15/04* (2006.01)

(52) U.S. Cl.
CPC .................. *B64C 9/02* (2013.01); *B64C 9/22* (2013.01); *B64D 15/04* (2013.01)

(58) Field of Classification Search
CPC .................................. B64C 9/02; B64D 15/02
See application file for complete search history.

(56) References Cited

U.S. PATENT DOCUMENTS

| 4,398,688 | A | 8/1983 | Williams |
| 4,615,499 | A | 10/1986 | Knowler |
| 6,394,396 | B2 | 5/2002 | Gleine et al. |

FOREIGN PATENT DOCUMENTS

| DE | 746714 C | 12/1944 |
| EP | 0068737 A1 | 1/1983 |
| GB | 2586053 A | 2/2021 |

OTHER PUBLICATIONS

European Search Report for corresponding European Patent Application No. 22179331 dated Nov. 23, 2022; priority document.
Wikipedia, "Leading-edge droop flap" https://en.wikipedia.org/wiki/Leading-edge_droop_flap, download on Jun. 1, 2022.
Wikipedia, "Airbus A350" https://en.wikipedia.org/wiki/Airbus_A350, download on Jun. 1, 2022.
Jirasek and Amoignon, "Design of a High-Lift System with Droop Nose Device" Article in Journal of Aircraft, Jun. 2009, DOI: 10.2514/6.2009-3614.

*Primary Examiner* — Jessica B Wong
(74) *Attorney, Agent, or Firm* — Greer, Burns & Crain, Ltd.

(57) ABSTRACT

A support arrangement for a leading-edge high lift device comprising a support arm for movably supporting the leading-edge high lift device on a wing structure. In order to accommodate the supply of the leading-edge high lift device with a fluid such as an anti-ice fluid, for example pressurized hot air, the support arm is configured as a fluid conduit for feeding fluid to and/or from the leading-edge high lift device. The leading-edge high lift device may be configured as a droop nose device.

20 Claims, 3 Drawing Sheets

SUPPORT ARRANGEMENT FOR A LEADING-EDGE HIGH LIFT DEVICE WITH A FLUID DUCT

CROSS-REFERENCES TO RELATED APPLICATIONS

This application claims the benefit of European Patent Application Number 22179331.8 filed on Jun. 15, 2022, the entire disclosure of which is incorporated herein by way of reference.

FIELD OF THE INVENTION

The invention relates to a support arrangement for a leading-edge high-lift device, especially a droop nose device. Further, the invention relates to a leading-edge high-lift system, an aircraft wing and an aircraft equipped with such support arrangement.

BACKGROUND OF THE INVENTION

For the technical background of the invention, reference is made to the following citations:
[1] Leading-edge droop flap—Wikipedia, https://en.wikipedia.org/wiki/Leading-edge_droop_flap, download on 1 Jun. 2022;
[2] Airbus A350—Wikipedia, https://en.wikipedia.org/wiki/Airbus_A350, download on 1 Jun. 2022;
[3] Jirasek and Amoignon, Design of a High Lift System with Droop Nose Device; Article in Journal of Aircraft, June 2009, DOI: 10.2514/6.2009-3614; and,
[4] U.S. Pat. No. 4,615,499 A1.

Leading-edge high lift systems known from [1] to [4] comprise a leading-edge high lift device such as a leading-edge slat or a Krueger flap or a leading-edge droop nose as well as a support arrangement for movably supporting the leading-edge high lift device to a structure of an aircraft wing.

As defined and known from [1] to [3], a leading-edge droop nose, also called leading edge droop flap or shortly just droop nose, is a device on the leading edge of aircraft wings designed to improve airflow at high pitch angles (high angle of attack). The leading-edge droop nose is similar to the leading-edge slat and the Krueger flap, but with the difference that the entire leading-edge section rotates downwards, whereas the slat and Krueger flap are panels which move away from the wing leading edge when it is deployed.

For avoiding ice accumulation, anti-ice systems are known supplying tempered fluids such as hot air to the interior of a leading-edge section of an aircraft wing, see for example [4]. [4] discloses an anti-ice duct for leading-edge slats wherein the anti-ice duct is configured as a telescopic duct. The telescopic duct is feeding the hot air into the slat, the telescopic duct is following the slat kinematics.

Anti-ice ducts currently used in aircrafts on the market comprise circular and linear telescopic ducts with variable length to follow the movable leading-edge kinematics. The length of the duct is increasing during extension. A spherical joint at the connect to the slat body is accommodating the build tolerances, wing bending, thermal and load displacements.

An object of the invention is to improve a fluid duct to a movable leading-edge high lift device, especially with regard to weight and costs.

SUMMARY OF THE INVENTION

For achieving this object, the invention provides a support arrangement according to claim 1. A leading-edge high lift system, an aircraft wing and an aircraft equipped with such support arrangement are the subject-matters of the further independent claims. Advantageous embodiments are subject-matters of the dependent claims.

According to a first aspect, the invention provides a support arrangement for a leading-edge high lift device comprising a support arm for movably supporting the leading-edge high lift device on a wing structure wherein the support arm is configured as a fluid conduit for feeding fluid to and/or from the leading-edge high lift device.

Preferably, the support arm has a tubular profile and/or is configured as a part of a fluid duct for ducting fluid to and/or from the leading-edge high lift device.

Preferably, the leading-edge high lift device is a leading-edge droop nose device (also called leading edge droop flap, see especially [1] to [3]). Accordingly, the support arrangement is preferably a hinge arrangement for a leading-edge droop nose. Preferably, the support arm is a hinge arm, a first end of the hinge arm having a first rotational joint to be rotatably connected to a structure of a wing, a second end of the hinge arm having a second rotational joint to be rotatably connected to a movable rounded front part of the wing.

Preferably, the hinge arrangement comprises a driving system for driving a rotation of the hinge arm around the first rotational joint.

In accordance with the droop nose kinematic, the hinge arm preferably has a fixed length between the first and second rotational joints. A simple beam with a fluid channel formed therein can be used as hinge arm. The profile section of the hinge arm may have a tubular section, eventually with further outer and/or inner ribs, ridges and/or webs for enhancing stiffness of the arm.

Preferably, the first rotational joint has a circular tube section and a bearing for rotatably supporting the circular tube section, the circular tube section extending transversal to the hinge arm and being fixed to the tubular profile so that the interiors thereof are in fluid communication.

Preferably, the second rotational joint comprises a fluid connection for ducting fluid to a fluid pipe or fluid chamber in the rounded front part.

Preferably, the second rotational joint comprises a link arm controlling an orientation of the rounded front part.

According to another aspect, the invention provides a leading-edge high lift system for an aircraft, comprising a movable leading-edge high lift device supported by a support arrangement according to any of the aforementioned embodiments.

Preferably, the leading-edge high lift device is a droop nose device for an aircraft, comprising a movable rounded front part of a wing including a fluid system wherein the support arrangement is a hinge arrangement for movably connecting the rounded front part to a wing structure and for feeding fluid to and/or from the fluid system.

Preferably, the movable leading-edge high lift device is supported with a plurality of support arms on the wing structure. Most of the support arms may be conventional support arms and one or a part of the support arms may have a tubular profile and/or a fluid channel in order to function as part of a fluid duct.

Preferably, the leading-edge high lift system includes an anti-ice system for distributing tempered fluid along a leading-edge region wherein the tempered fluid is supplied through at least one of the support arms of the support arrangement.

According to a further aspect, the invention provides an aircraft wing having a leading-edge high-lift system according to any of the aforementioned embodiments.

According to another aspect, the invention provides an aircraft having a support arrangement, a leading-edge high-lift system and/or an aircraft wing according to any of the aforementioned embodiments.

Preferred embodiments of the invention have a slat or flap or droop nose support arm that doubles as a fluid conduit for supplying fluid to the leading-edge slat or flap or droop nose.

In some embodiments, the fluid is air and supplied at high pressure and temperature to the slat/flap/droop nose for anti-ice purposes. However, the conduit could also be used to transfer fluids for other purposes e.g., air for flow control purposes in the leading-edge slat/flap/droop nose, etc. In some embodiments, a circular cross section of the conduit is provided, but the cross section of the support arm can be any closed profile as long as it can be supported and loaded as required.

Some embodiments relate to a full span droop nose planform. Especially, some embodiments relate to an integration of a structural anti-ice duct into a full span droop nose configuration.

Some embodiments relate to an implementation of a full span droop nose configuration on future aircrafts. In some embodiments one structural support of one droop nose is combined with the anti-ice duct, which feeds the high lift device with hot air.

In some embodiments one classical hinge arm is changed to a structural anti-ice duct. Preferably, the high-lift device supported by the hinge arm is a leading-edge droop nose device. The kinematics of a droop nose differs from a slat kinematics. Main difference is the location of the hinge point. For the droop nose it is inside the wing profile. Taking the benefit out of this constraint the anti-ice duct length does not need to be increased during deployment and retraction of the droop nose. As well the duct can be structural strengthen to take loads from the device. All attachments on the hinge arm are mounted to the structural duct.

Advantages of preferred embodiments are to reduce the cut outs in the wing fixed leading edge as well as closing elements for the holes in high-speed configuration. Less supporting ribs in the wing fixed leading edge are needed.

DETAILED DESCRIPTION OF THE DRAWINGS

A preferred embodiment of the invention is described in more detail below referring to the accompanying drawings in which.

DETAILED DESCRIPTION OF THE PREFERRED EMBODIMENTS

Figure 1:
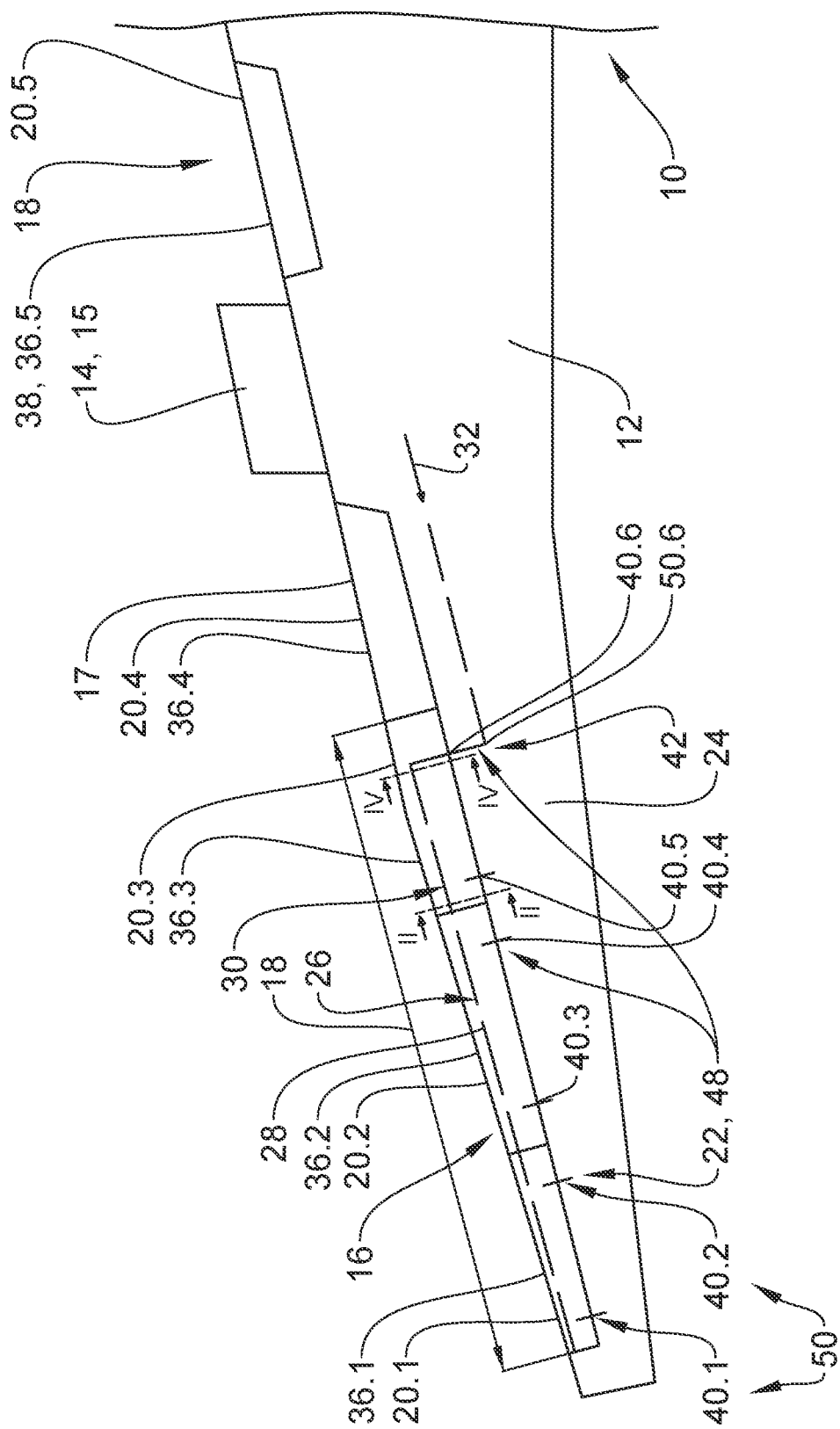
FIG. 1 is a schematic top view of an aircraft wing of an aircraft including a leading-edge high lift system and an anti-ice system in the region of a leading edge.

FIG. 1 shows an aircraft 10 in form of an airplane with an aircraft wing 12 and an engine 14 with a turbine 15. In the region 16 of a leading edge 17 of the aircraft wing 12, there is a leading edge high-lift system 18 including a first to fifth leading-edge high lift device 20.1-20.5 and a support arrangement 22 for movably supporting the high lift devices 20.1-20.5 on a structure 24 of the aircraft wing 12.

The leading-edge high lift system 18 comprises a fluid system 26 with a fluid pipe 28 and/or a fluid chamber and/or a fluid distribution system. In the embodiment shown, the fluid system 26 is an anti-ice system 30 for distributing anti-ice fluid 32 such as hot pressurized air, e.g., bleed air from the turbine 15, along at least a part of the leading-edge region 16. However, the fluid system 26 may have (any) other function(s) such as a de-ice system or a fluid control system—e.g., a hydraulic or pneumatic system.

In the preferred embodiment shown, the leading-edge high lift system 18 is a leading-edge droop nose system 34 wherein at least a part of the leading-edge high lift devices 20.1-20.5, here the first to fourth high lift device 20.1-20.4, are configured as a droop nose device 36.1-36.4. The innermost fifth high-lift device 20.5 may be configured as a slat 38 or as a fifth droop nose device 36.5.

Figure 2:
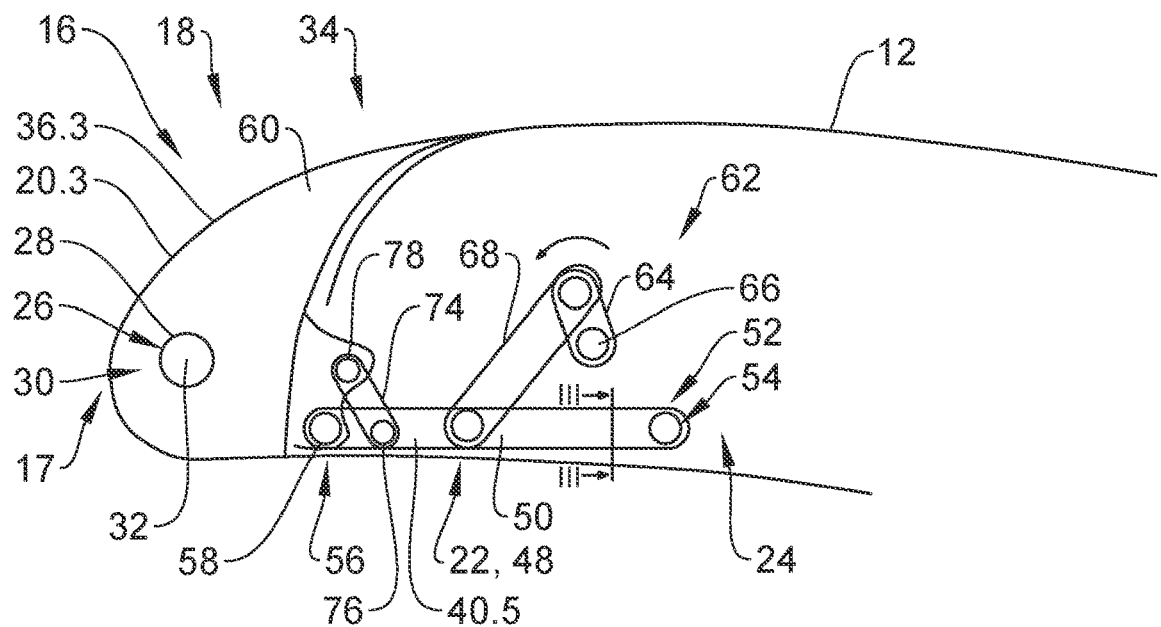
FIG. 2 is a schematic cross-sectional view of the leading-edge region of the aircraft wing along line II-II of FIG. 1 showing a leading-edge high lift device and a support arrangement with a support arm.
Figure 3:
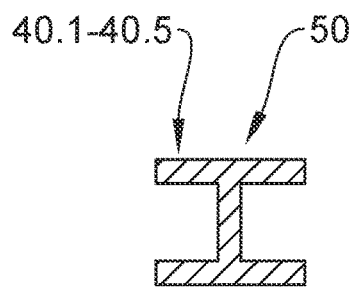
FIG. 3 is a cross sectional view of the support arm along line III-III of FIG. 2.
Figure 4:
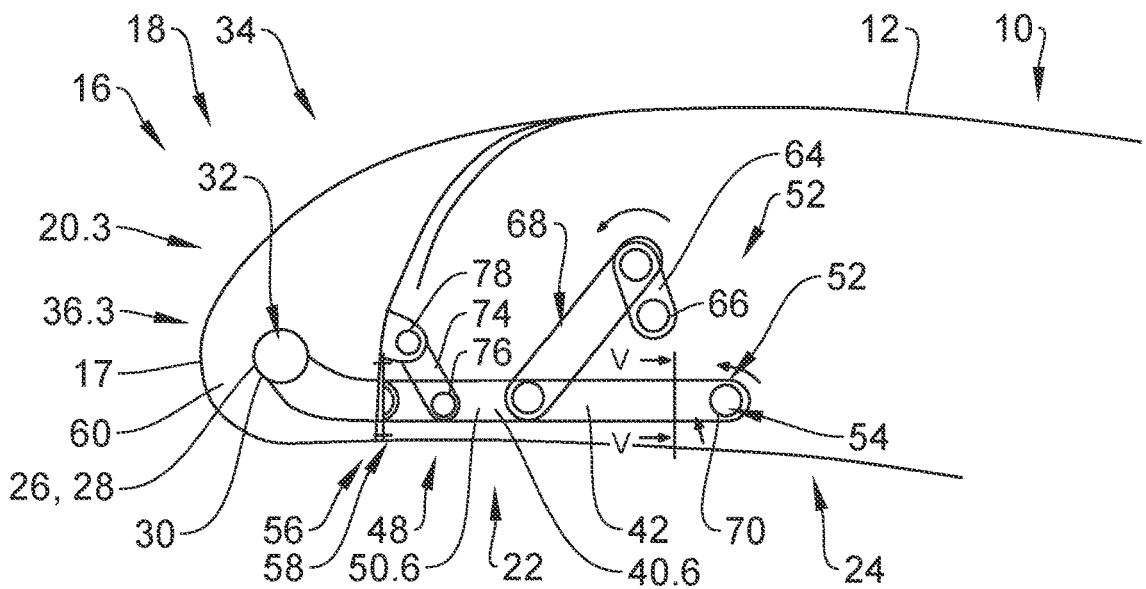
FIG. 4 is a schematic cross-sectional view of the leading-edge region of the aircraft wing along line IV-IV of FIG. 1 showing the leading-edge high lift device and the support arrangement with a further support arm.

Referring now to FIGS. 2 and 4, the support arrangement 22 is configured to movably support at least one or several of the leading-edge high lift devices 20.1-20.5 on the wing structure 24. The support arrangement 22 comprises several support arms 40.1-40.6 movably supporting the leading-edge high lift devices 20.1-20.5 on the wing structure 24. Each high lift device 20.1-20.5 is supported by two or more of the support arms 40.1-40.6. As visible from FIGS. 2 and 3, most of the support arms 40.1-40.5 have a conventional cross section such as a double T cross section as this is known from the droop nose system of the Airbus A350, see [2].

Figure 5:
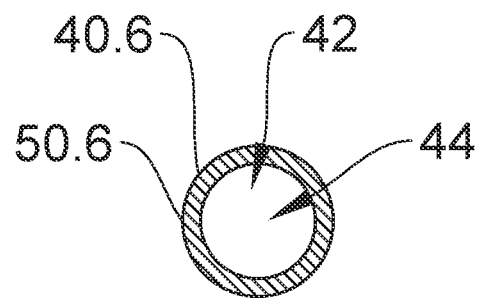
FIG. 5 is a cross sectional view of the further support arm along line V-V of FIG. 4.
Figure 6:
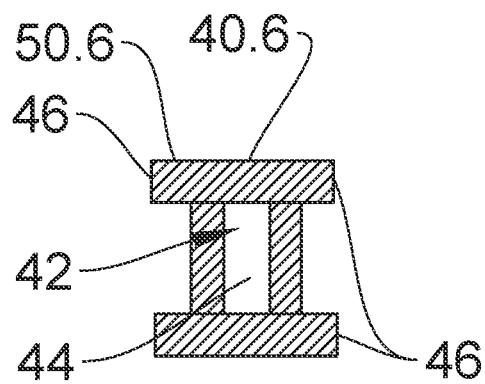
FIG. 6 is a cross sectional view of the further support arm along line V-V of FIG. 4 according to another embodiment; and, FIG. 7 is a schematic perspective view of a rotational joint for the further support arm of the support arrangement.

Referring further to FIGS. 4 to 6, at least one of the support arms 40.1-40.6, here the sixth support arm 40.6, is—additionally to its function for movably supporting the associated high-lift device 20.3—configured as a fluid conduit or fluid duct 42 for feeding fluid to and/or from the leading-edge high lift device 20.3. The sixth support arm 40.6 has a tubular profile and is configured as a part of the fluid duct 42 for ducting fluid to and/or from fluid system 26. Referring to FIG. 5, the cross section of the sixth support arm 40.6 may be a circular tubular section, but also other cross sections are possible as long as a (closed) fluid channel 44 is provided along the support arm 40.6 that doubles as a fluid conduit. FIG. 6 shows another example for the tubular section formed as a double H profile wherein the cross section of the fluid channel 44 is rectangular, and the profile of the support arm 40.6 includes outer enforcement ribs 46.

In the embodiment shown, the first to fourth leading edge high-lift devices 20.1-20.4 are configured as a leading-edge droop nose device 36.1-36.4, and the support arrangement 22 is configured as a hinge arrangement 48 for the leading-edge droop noses wherein the support arms 40.1-40.6 are configured as hinge arms 50, 50.6 wherein a first end 52 of the hinge arm 50, 50.6 has a first rotational joint 54 to be rotatably connected to the structure 24 of the wing 12 and a second end 56 of the hinge arm 50 has a second rotational joint 58 to be rotatably connected to a movable rounded front part 60 of the wing 12.

The hinge arrangement 48 further comprises a driving system 62 for driving a rotation of the hinge arm 50, 50.6 around the first rotational joint 54. In the embodiment shown, the driving system 62 comprises a drive arm 64 that may be fixedly connected to a rotatable driving shaft 66. The free end of the drive arm 64 is connected via a link rod 68 to the hinge arm 50.

While the first and second rotational joints 54, 58 of most of the hinge arms 50 (here the first to fifth support arms 40.1-40.5) are conventional and in principle known from the conventional droop nose systems such as those of Airbus A350, the first and second rotational joints 54, 58 at the ends 52, 56 of the hinge arm 50.6 which also functions as a fluid conduit (here the sixth hinge arm 50.6 which forms the sixth support arm 40.6) are configured such that pressurized fluid may be conducted through the rotational joints 54, 58.

Figure 7:
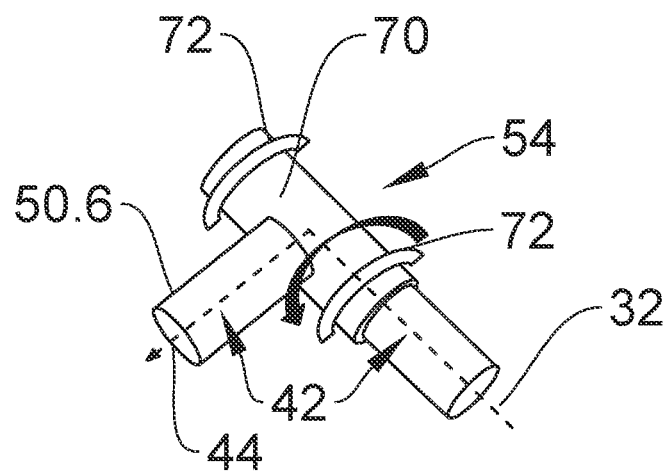

A possible embodiment of such rotational joint 54, 58 configured as fluid conduit is explained using the example of the first rotational joint 54 shown in FIG. 7. The first rotational joint 54 has a circular tube section 70 and a bearing 72 for rotatably supporting the circular tube section 70. The circular tube section 70 extends transversal to the hinge arm 50.6, i.e., transversal to the longitudinal extension of the hinge arm. The circular tube section 70 is fixed to the tubular profile of the hinge arm 50.6 so that the interiors thereof are in fluid communication, and pressurized fluid such as anti-ice fluid 32 can be conducted from an anti-ice fluid supply (e.g., the turbine 15) through the circular tube section 70 into the fluid channel 44 of the hinge arm 50.6.

Similarly, the pressurized anti-ice fluid 32 is conducted through the second rotational joint 58 into the fluid system 26 arranged in the droop nose devices 36.1-36.3, as indicated in FIG. 4.

Referring to FIGS. 2 and 4, the hinge arrangement 48 further includes a link arm 74 for connecting a hinge arm linkage point 76 with a droop nose linkage point 78. The hinge arm linkage point 76 is located at the hinge arm 50, 50.6 with distance to the rotation axis of the second rotational joint 58. The droop nose linkage point 78 is located at the rounded front part 60 with distance from the rotation axis of the second rotational joint 58. Hence, the orientation of this rounded front part 60 during movement of the hinge arm is controlled and set by via the link arm 74.

The configuration of the support arm 40.6 to function both for movable support of a high-lift device 20.3 and for feeding fluid 32 to and/or from the high-lift device 20.3 has been explained using an example where the support arm 40.6 is a hinge arm 50.6 for a droop nose device 36.3. This has the advantage that such hinge arm 50.6 has a fixed length, and it is easy to implement a fluid conduit just by choosing a tubular section for the hinge arm 50.6. In further embodiments (not shown), the support arm 40.6 is a telescopic support arm for a slat wherein the fluid channel is formed within members of the telescopic support arm. In other embodiments (not shown) more than one of the support arms 40.1-40.6 is configured as a fluid conduit. This enables e.g., providing closed loop fluid systems with a fluid supply conduit and a fluid discharge conduit.

A support arrangement (22) for a leading-edge high lift device (20.3) has been described which comprises a support arm (40.6) for movably supporting the leading-edge high lift device (20.3) on a wing structure (24). In order to improve the possibility to supply the leading-edge high lift device (20.3) with a fluid such as an anti-ice fluid (32), for example pressurized hot air, the support arm (40.6) is configured as a fluid conduit for feeding fluid (32) to and/or from the leading-edge high lift device (20.3). According to preferred embodiments, the leading-edge high lift device (20.3) is configured as a droop nose device (36.3).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 aircraft
12 wing
14 engine
15 turbine
16 leading-edge region
17 leading edge
18 leading-edge high lift system
20.1 first leading edge high lift device
20.2 second leading edge high lift device
20.3 third leading edge high lift device
20.4 fourth leading edge high lift device
20.5 fifth leading edge high lift device
22 support arrangement
24 (wing) structure
26 fluid system
28 fluid pipe
30 anti-ice system
32 anti-ice fluid
34 leading-edge droop nose system
36.1 first droop nose device
36.2 second droop nose device
36.3 third droop nose device
36.4 fourth droop nose device
36.5 fifth droop nose device
38 slat
40.1 first support arm
40.2 second support arm
40.3 third support arm
40.4 fourth support arm
40.5 fifth support arm
40.6 sixth support arm
42 fluid duct
44 fluid channel
46 enforcement ribs
48 hinge arrangement
50.6 hinge arm
52 first end
54 first rotational joint
56 second end
58 second rotational joint
30 rounded front part (=droop nose)
62 driving system
64 drive arm 66 driving shaft
68 link rod
70 circular tube section
72 bearing
74 link arm
76 hinge arm linkage point
78 droop nose linkage point

The invention claimed is:

1. A support arrangement for a leading-edge high lift device of a wing, the support arrangement comprising:
   a hinge arm configured to movably support the leading-edge high lift device on a wing structure, wherein a first end of the hinge arm has a first rotational joint configured to be rotatably connected to the wing structure, and
   a driving system for driving a rotation of the hinge arm around a rotation axis of the first rotational joint, wherein the driving system includes a drive arm with a first end which is connected to a link rod at a first end of the link rod, such that an opposite second end of the link rod is directly connected to the hinge arm at a linkage point which is between the first end and a second end of the hinge arm,
   wherein the hinge arm is configured as a fluid conduit for feeding fluid to, or from, or both to and from the leading-edge high lift device.

2. The support arrangement according to claim 1, wherein the hinge arm has a tubular profile and is configured as a part of a fluid duct for ducting fluid to, or from, or both to and from the leading-edge high lift device.

3. The support arrangement according to claim 1, wherein the second end of the hinge arm has a second rotational joint configured to be rotatably connected to a movable rounded front part of the wing.

4. The support arrangement according to claim 3, wherein the hinge arm has a fixed length between the first and second rotational joints.

5. The support arrangement according to claim 3, wherein the first rotational joint has a circular tube section and a bearing for rotatably supporting the circular tube section, the circular tube section extending transversal to the hinge arm and being fixed to the hinge arm so that interiors thereof are in fluid communication.

6. The support arrangement according to claim 3, wherein the second rotational joint comprises a fluid connection for ducting fluid to a fluid system, fluid pipe or fluid chamber in the rounded front part.

7. The support arrangement according to claim 3, wherein the support arrangement comprises a rounded front part arm for controlling an orientation of the rounded front part.

8. A leading-edge high lift system for an aircraft comprising: a movable leading-edge high lift device supported by the support arrangement according to claim 1.

9. The leading-edge high lift system according to claim 8, wherein the leading-edge high lift device is a droop nose device comprising a movable rounded front part of a wing including a fluid system.

10. The leading-edge high lift system according to claim 9, wherein the second end of the hinge arm has a second rotational joint configured to be rotatably connected to the movable rounded front part of the wing.

11. The leading-edge high lift system according to claim 10, wherein the hinge arm has a fixed length between the first and second rotational joints.

12. The leading-edge high lift system according to claim 10, wherein the first rotational joint has a circular tube section and a bearing for rotatably supporting the circular tube section, the circular tube section extending transversal to the hinge arm and being fixed to the hinge arm so that interiors thereof are in fluid communication.

13. The leading-edge high lift system according to claim 9, wherein the second rotational joint comprises a fluid connection for ducting fluid to a fluid system, fluid pipe or fluid chamber in the rounded front part.

14. The leading-edge high lift system according to claim 9, wherein the support arrangement comprises a rounded front part arm for controlling an orientation of the rounded front part.

15. The leading-edge high lift system according to claim 8, wherein the movable leading-edge high lift device is supported with a plurality of the hinge arms on a wing structure, wherein at least one of the hinge arms has a tubular profile and is configured as part of a fluid duct.

16. The leading-edge high lift system according to claim 15, further comprising:
   an anti-ice system for distributing tempered fluid along a leading-edge region wherein the tempered fluid is supplied through at least one of the hinge arms of the support arrangement.

17. An aircraft wing comprising:
   the leading-edge high-lift system according to claim 8.

18. An aircraft comprising:
   the aircraft wing according to claim 17.

19. The support arrangement according to claim 1, wherein a second end of the drive arm, which is opposite to the first end of the drive arm, is fixedly connected to a rotatable driving shaft.

20. The support arrangement according to claim 19, wherein the drive arm has a length which is less than a length of the link rod.

* * * * *